* United States Patent *

Witowski

(10) Patent No.: US 6,872,197 B1
(45) Date of Patent: Mar. 29, 2005

(54) TANK FOR ADMINISTERING FLOWABLE SUBSTANCES

(75) Inventor: Norbert Witowski, Wolfenbüttel (DE)

(73) Assignee: Schering AG, Berlin (DE)

(*) Notice: Subject to any disclaimer, the term of this patent is extended or adjusted under 35 U.S.C. 154(b) by 0 days.

(21) Appl. No.: 09/554,438

(22) PCT Filed: Nov. 16, 1998

(86) PCT No.: PCT/EP98/07292

§ 371 (c)(1),
(2), (4) Date: Jun. 7, 2000

(87) PCT Pub. No.: WO99/25308

PCT Pub. Date: May 27, 1999

Related U.S. Application Data

(60) Provisional application No. 60/067,342, filed on Dec. 2, 1997.

(30) Foreign Application Priority Data

Nov. 14, 1997 (DE) .......................................... 197 51 406

(51) Int. Cl.⁷ .......................... A61B 19/00; A61B 17/06; A61F 7/12; B65D 85/84
(52) U.S. Cl. ........................ 604/408; 604/113; 604/415; 604/403; 206/438; 206/524.4
(58) Field of Search ................................. 604/113, 408, 604/410, 403, 262, 415, 409; 206/438, 828, 524.4; 229/117.27; 96/119

(56) References Cited

U.S. PATENT DOCUMENTS

| 4,382,538 A | 5/1983 | Wilharm |
| 4,484,351 A | 11/1984 | de Leeuwe et al. |
| 4,898,301 A * | 2/1990 | Schick .................. 229/117.26 |
| 5,295,964 A | 3/1994 | Gauthier |
| 5,295,967 A | 3/1994 | Rondelet et al. |
| 5,593,385 A * | 1/1997 | Harrison et al. ........... 131/64.1 |
| 6,203,535 B1 * | 3/2001 | Barney et al. ................. 53/452 |

FOREIGN PATENT DOCUMENTS

| DE | 2262 708 | | 12/1972 |
| EP | 0 102 302 | * | 3/1984 |
| EP | 0 126 473 | * | 11/1984 |
| WO | WO 97/02001 | | 1/1997 |
| WO | 97 02001 | * | 1/1997 |

OTHER PUBLICATIONS

Rompp Chemie Lexikon, Herausgeber, Prof. Dr. Jurgen Falbe, Prof. Dr. Manfred Regitz, Bearbeitet von zahlreichen Fachkollegen Zentralredaktion: Dr. Elisabeth Hellen– – Maske.

Chemie Fakten und Gesetze, W. Schroter, Dr. Habil K.–H. Lautenschlager, H. Bibrack.

* cited by examiner

*Primary Examiner*—Brian L. Casler
*Assistant Examiner*—Roz Maiorino
(74) *Attorney, Agent, or Firm*—Millen, White, Zelano & Branigan, P.C.

(57) ABSTRACT

The invention relates to a reservoir (100) for dispensing free-flowing substances, which comprises the following features: (a) reservoir (100) has flexible reservoir walls (2 and 3); (b) reservoir walls (2 and 3) are one-piece or connected to one another; (c) reservoir walls (2 and 3) form a sealed container, which has at least one opening (12); (d) reservoir walls (2 and 3) are connected at least partially to at least two flat standing elements (6), which are separated in the standing area of reservoir walls (2 and 3); (e) opening (12) has a closure (13), whereby at least portions of reservoir walls (2 and 3) and/or standing elements (6) consist of a composite material, which (i) consists of plastic laminates, or (ii) consists of at least one plastic laminate and an aluminum laminate, here, the laminates are connected to one another. Reservoir (100) is provided preferably to accommodate contrast media.

21 Claims, 4 Drawing Sheets

TANK FOR ADMINISTERING FLOWABLE SUBSTANCES

This application claims the benefit of provisional application No. 60/067,342, filed Dec. 2, 1997.

The invention relates to a reservoir for dispensing free-flowing substances. In this case, this is especially a container into which pharmaceutical substances, preferably contrast media, are decanted. They are used as reservoirs for infusions. This application claims the priority of the filing on Nov. 14, 1997 with the German Patent Office with file number DE 197 51 406. In addition, for the USA, the USA-filing of Dec. 2, 1997 has the USA file number 60/067,342.

PRIOR ART

U.S. Pat. No. 5,295,967, which was issued on Mar. 22, 1994, describes a reservoir that is suitable for dispensing infusion liquids. Such a reservoir has flexible reservoir walls, which are bonded to one another in the edge areas. As a result, the reservoir walls form a sealed container, which has two openings in the lower area. One of these openings is connected to the infusion instrument. The opening, which extends into the infusion instrument, is on the lower part of the reservoir. The reservoir can be suspended, whereby in the upper area of the reservoir, the front and rear walls of the reservoir are bonded to one another, and the reservoir has an opening in the bonding area, which makes it possible to suspend the entire reservoir. In addition, the reservoir has a scale, which extends from above downward and is attached to the reservoir.

From the detergent industry, reservoirs are also known in which liquid detergent is located. Such containers have an opening which, in contrast to the above, is located in the upper area of the reservoir. Such containers have a front and a rear reservoir wall, a front wall and a rear wall, which all are flexible. They are bonded to one another in the edge areas. The reservoir walls are surrounded by standing elements, which are separated in the standing area from the reservoir walls. The standing elements are also bonded to one another in the side and upper areas, so that they form a container. Only in the bottom area, i.e., in the lower area, do the standing elements in the filled state of the container have no contact. In this area, the two standing elements are bonded to one another via the reservoir walls, which in this case form the bottom portions of the reservoir. Such containers are usually printed with colors and symbols. The disadvantage of this container consists in the fact that the corresponding materials are not compatible with pharmaceutical and diagnostic substances. The imprinting process has also turned out to be problematical.

PROBLEM AND SOLUTION

The object is thus to present a reservoir with flexible reservoir walls, whereby the reservoir is stable enough to be able to stand in the filled or partially emptied state on a relatively small surface. In addition, the reservoir is to be compatible with pharmaceutical agents and diagnostic agents and can be emptied without problems.

The object is achieved by a reservoir for dispensing free-flowing substances, whereby the reservoir comprises the following features:

(a) the reservoir has flexible reservoir walls;
(b) the reservoir walls are one-piece or are connected to one another;
(c) the reservoir walls form at least portions of a sealed container, said container has at least one opening;
(d) the reservoir walls are partially connected to at least two flat standing elements,
which are separated from the reservoir walls in the standing area; and
which are optionally portions of the sealed container,
(e) the opening has a closure and a connection, preferably a double closure,
whereby
(i) portions of the reservoir walls and/or standing elements are made of a material that comprises at least one plastic laminate, optionally a composite material, and
(ii) the other portions of the reservoir walls and/or standing elements are made of a composite material, which comprises at least one plastic laminate and an aluminum laminate,
in this case, the laminates are tightly connected to one another.

Advantages

The invention has various advantages. Flexible reservoirs are very desirable: they are easy to handle, and their shelf life and handling entail no problems. As long as the reservoir walls are stable enough, tearing-off of the container will not occur. In addition, it is advantageous to be able to use materials that have already been widely distributed in the pharmaceutical industry. Infusion containers have been used for a long time, particularly with blood transfusions. They are made, however, of PVC material, which is very controversial from the ecological standpoint. It is advantageous that the containers and reservoirs according to the invention can be set up with ease since they take up relatively little space in the set-up position. On one and the same surface, considerably more reservoirs can be safely set up than would be possible with flat containers.

When at least portions of the reservoir walls or standing elements are made of composite materials with aluminum, printing of the corresponding reservoirs can be done with no problem. In this case there is the advantage that neither adhesives, which must be used in the case of labels, nor color residues can penetrate into the interior of the reservoir. Such contaminations are especially problematical and arise in particular if the free-flowing substance, for example the contrast medium, is to be stored over a long period of time. An aluminum laminate successfully prevents the passage of dyes.

In addition, this ensures that the reservoirs can be printed in an irreparable way. It is advantageous that in addition to planar pressure, the letters or symbols can also be imprinted. As a result, precise matching of the reservoir contents to the reservoir outer surface is possible. This prevents the reservoirs from being confused with one another. Thus, considerably greater reliability is ensured by using such reservoirs in the area of medications and in the diagnostic field.

In addition, the aluminum laminate protects the contents of the container from the environment. Release of the pharmaceutical agent components and the entry of substances other than the pharmaceutical agents are largely impossible. Also, it is not necessary to use additional protective packaging for the standing floor containers while the pharmaceutical agent is in storage. In the case of repeated use (partial removal), the container contents are adequately protected by the aluminum composite.

Due to the transparency of the front walls of the reservoirs, they can be optically checked right after filling by the pharmaceutical manufacturer and before use by the physician. It should be emphasized in addition that the opening of the reservoir is protected in multiple ways. The opening, including the screw-valve closure, is surrounded by a protective film, which is a part of the reservoir wall or is connected to the latter.

Definition

A reservoir is a vessel in which free-flowing substances can be received. It is essential to the reservoir that the latter be able to seal off permanently such free-flowing substances from the outside world. In addition, it is important that the reservoir avoid altering the free-flowing substances contained within it. Pharmaceutical agents or else diagnostic substances must not be chemically altered. Substances must also not penetrate the reservoir and either be dissolved in the free-flowing substance or be mixed with the latter. In principle, the shape of the reservoir is not specified, but there are practical considerations such as storage and outflow. Thus, when the reservoir is being emptied, it is to be ensured that the entire free-flowing substance can exit from it. The formation of cavities and angles from which the free-flowing substance cannot escape is to be strictly avoided. In the case of the reservoir, it is important that it can be easily produced and can be easily filled with the free-flowing substance.

The reservoir walls have the object of separating the free-flowing substance from the environment and of preventing the free-flowing substance from exiting. Conversely, it is also important that substances from the environment be prevented from penetrating the free-flowing substance. The reservoir walls are flexible when the operator applies force. Only when the reservoir is set up on the standing elements must the standing elements be rigid relative to the static forces of the reservoir. It is desirable for the reservoir walls to be impermeable to both liquids and gases. In this connection, it can also be seen that the diffusion of gases occurs with almost any material. It is essential that the diffusion of gases be small, such that there is no impairment of the free-flowing substance contained within the reservoir. The latter should also not occur if the free-flowing substance in the reservoir is stored over a prolonged period, such as, for example, one to two years. It is essential that the reservoir walls have substances that increase flexibility, but that cannot penetrate the free-flowing substance. Thus, for example, plastics also contain softeners. These softeners should be able to penetrate only to a negligible extent into the free-flowing substance.

Free-flowing substances are defined as all pharmaceutical and diagnostic substances. In this case, these are medications, including their pharmaceutically compatible adjuvants and vehicles. It is commonly the case that in addition to a liquid, gases in the form of a gas bubble are also still found in reservoirs. In addition, free-flowing substances also comprise liquids, solids, and gaseous substances. Such mixtures are described in W. Schröter et al.: Chemie, Fakten und Gesetze [Chemistry, Facts and Laws], Leipzig 1987, 14th Edition, p. 24. In addition, suspensions, emulsions, and micelle solutions, such as liposomes, are also of interest.

The reservoir can be filled and emptied through the opening. In this case, a filling opening and an emptying opening that is separated from it can be fastened to the reservoir. The openings are preferably bonded with the entire reservoir, with the reservoir walls. The openings are supposed to make it possible for the infusion instrument, including a pumping device, to be connected with ease to the reservoir. The openings must be large enough to permit flow rates of 2–10 ml/sec through the openings. Such openings are preferably sterilized and are protected from contamination by closure caps only after these closure caps are removed can the infusion instrument or the pump be connected to the opening. Extreme sterility must be ensured since it has to be expected that reservoirs, once opened, will have to remain free of contamination over several hours, indeed up to several days.

The standing elements have the object of making the reservoir, which preferably consists of two reservoir walls that are bonded to one another, stable enough that this reservoir can also stand up reliably when set up. The set-up form is defined such that the container comes to stand on one edge, whereby preferably the edge selected is the one that has the smallest length and that lies against the opening. In this case, the standing elements should have holes which do not compromise the tightness of the reservoir but which make it possible to suspend the entire reservoir. This makes it possible for the reservoir to be able to flow out through the opening. This shows that the opening lies against the suspending device as much as possible. The standing elements are preferably less flexible than the reservoir walls. They must be connected to the reservoir walls at least in small areas to have the appropriate strength. In this case, a durable and reliable transition between the reservoir wall and standing element is also to be ensured. The standing element does not need to touch the entire length of the bottom, but it is to be ensured that even when there are few contact points with the bottom, adequate stability of the reservoir is ensured. The standing elements can also be built in such a way that they virtually replace the reservoir walls as a whole. Only in the standing area, i.e., in the lower area of the reservoir, are there reservoir walls that are no longer directly connected to the standing element but rather via a welding seam or a pasted seam. Rather, the reservoir walls between the standing elements in the standing area are built in such a way that they extend in a sealing manner between the standing elements. In this case, it is advantageous if the surfaces that are formed by the reservoir walls behave like a fold in the lower area of the reservoir that in the folded-together position points upward toward the opening. If the reservoir is filled, this fold, which consists of the reservoir walls, folds downward and then forms the bottom of the reservoir. In principle, the standing elements and the reservoir walls may be replaced in many areas. In this case, it is essential, however, that the functions still be ensured. The reservoir walls have the function of preventing gases and liquids from penetrating. The standing elements have the function of providing adequate stability to the reservoir, so that it comes to rest firmly in the upright position on the standing elements. The extent to which standing elements and reservoir walls extend varies as desired from shape to shape. It is essential, however, that the standing elements be physically separable from one another in the lower area, pointing toward the bottom. They are to border and encompass a standing area in the contact area with the bottom.

Plastic laminates are flat plastics, which are described in detail in Römpp-Chemie-Lexikon, publisher Jürgen Falbe and Manfred Regitz, 9th Edition, Stuttgart 1990, p. 2398 ff. Softeners and admixtures are also necessarily plastics. The plastics must have the property of being flexible in the presence of the forces that are exerted by the operator. In the case of static forces that are present in a reservoir that is set up separately, the standing elements are to be essentially rigid relative to the standing area. At the same time, the plastics should have an absolute-sealing function, so that liquids and gases can penetrate this plastic laminate only negligibly. The plastic laminates can be transparent to various extents; they are preferably completely transparent laminates. It should be possible preferably to bond or glue the plastic laminates, so that wall portions can be connected to one another easily in the edge areas of the reservoir.

At least one portion of the reservoir walls should be covered with an aluminum laminate. This is an additional laminate that is contained in the plastic laminate. This has the advantage that as a result, the gas permeability is suppressed in this portion of the reservoir. In addition, the aluminum laminate makes it possible for the aluminum laminate to be printed on the side that faces away from the free-flowing substance toward the outside. Printing inks and solvents cannot penetrate the aluminum laminate, so that there is absolutely no threat to the free-flowing substance. This is also guaranteed that after the fact the inscription will be tightly bonded to the reservoir. The inscription can no longer be detached from the reservoir without the reservoir itself being destroyed in this case. This ensures that the reservoirs and the imprinting cannot be mixed up. Thus, aluminum laminates show imprinting that in the case of weather effects or soaking have made otherwise commonly bonded labels illegible or have detached them. Since aluminum is relatively rigid and can be embossed, the letters and symbols can also be stamped with pressure, so that even after loss of color, the imprinting can still be read. In addition, aluminum has the advantage that in the area which faces toward the free-flowing substance, a mirror effect occurs. As a result, the observer can immediately critically view the contents of the reservoir, if the wall opposite the aluminum laminate is made of completely transparent material. The consistency, any possible contaminants, or problems in the reservoir can thus be detected immediately.

Other Embodiments

A reservoir according to the invention, in which the reservoir walls comprise a front wall and a rear wall, is advantageous. Such a reservoir is a very simple method, especially in terms of production. Two walls, namely the front wall and the rear wall, are placed on one another and bonded together in the outside areas, whereby a recess is provided for the opening. In addition to bonding, the walls can also be glued. In the emptied state, such folding containers take up virtually no space. Owing to the standing elements, however, in the filled state, such a reservoir is readily able to stand firmly on an even surface. Thus, stability functions and minimization of the space requirement in the emptied state are related to one another. Owing to their flexibility, it is also possible to store the filled reservoirs in a reasonable manner. Here, stacking various reservoirs on top of another can be done with ease.

A reservoir in which the rear wall is provided with an aluminum laminate is preferable; in this case, the front wall is transparent. The combination of the printability and the transparency of the opposite reservoir wall is the most advantageous. It ensures that the reservoir is to be provided with clear identification. Confusion regarding the substances and the reservoirs is no longer possible if other commonly used precautionary measures are taken. In this case, the aluminum laminate can be large enough to have a suitable label and also other coding systems. On the inside of the aluminum laminate, pointing toward the free-flowing substances, a scale can be found which indicates what volumes are still present in the reservoir.

Another very advantageous embodiment consists of a reservoir in which the front wall consists of polyester propylene and the rear side consists of polyester-aluminum-polypropylene. In this case, these are various layers that are connected to one another via bonding. In this case, they form so-called composite films.

Preferred are reservoirs according to the invention in which the aluminum is to be provided with a plastic laminate on the side that faces away from the interior of the container. This ensures protection against tearing. Considerably greater tensile strength is imparted to the container on the surface. Thin aluminum laminates that have the previously mentioned advantages can be torn easily by mechanical action. To prevent this and to ensure the previously mentioned advantages, the reservoirs are provided with the additional protective layer. In addition, this reservoir has a considerable advantage during production. Such outside surfaces can be simply bonded or glued, without high temperatures having to be used. In this case, it is advantageous if the reservoirs are provided with outside plastic laminate at least in the areas of the sealing seams.

More preferred are reservoirs in which the inside laminate (facing toward the interior of the container) is at least made of polypropylene, the middle laminate is made of aluminum, and the outer laminate is made of transparent plastic. This three-layer structure is functional. It corresponds to plastic, aluminum, and again plastic.

In most cases, reservoirs are preferred in which the outside laminate is made of polyester or polyamide. These are especially suitable materials.

Reservoirs according to the invention, in which the reservoir walls are more flexible than the standing elements, are advantageous. This ensures that the reservoirs are able to stand upright no matter how full they are. Preferred, however, are two filling stages; on the one hand, the completely emptied state, and, on the other hand, the completely filled reservoir. The reservoirs are usually handled by the operator in these two states. The partially filled states occur only if corresponding amounts of free-flowing substance are removed from the reservoirs; this occurs if the reservoirs are normally emptied in a suspended form. In this case, the opening invariably comes to rest at the lowermost point of the reservoir.

Reservoirs in which the reservoir walls are expansion-resistant are advantageous. This ensures that, even under major pressures, such as can occur when the reservoirs are stacked or are subjected to heavy short-term stresses, the reservoirs cannot buckle relative to the reservoir walls. The latter is a desired form of safety that guarantees that the reservoir walls will be prevented, in a controlled way, from tearing apart. In addition, the resistance to expansion guarantees that the reservoirs can also be stored in stacks at certain depots. This also prevents problems during filling.

More preferred are reservoirs according to the invention, in which the reservoirs have at least one suspension, which faces the opening. This ensures that the contents of a reservoir can be completely emptied. Such a suspension can be configured in various ways; it can just be an eye or a pitting, which is located in the wide welding seam of the reservoir walls. It can also be an additional material, however, which is connected in a flat manner to at least one of the reservoir walls. The suspension can also consist of a bayonet or adapter closure, which can be connected to a corresponding complementary suspension on a frame. In practice, it is useful to arrange the suspension and the opening at a diagonal with respect to one another.

A reservoir according to the invention, in which the closure is a screw closure with a tamper-proof closure and/or a closure that can be opened with an adapter, is advanta geous. This ensures that, on the one hand, removal can be carried out only once, and, on the other hand, sterility can be guaranteed. The problem of sterility is to be taken very seriously, and corresponding solutions for this purpose are very advantageous.

Preferred in most cases is a reservoir of the type according to the invention, whereby the opening including the closure is encompassed by a protective film, which is part of the reservoir walls or is connected to the latter. This ensures that after a sterilization process, which is carried out after the reservoir is filled, a sterile closure also remains in this sterile form. This optimally ensures that contamination of the connecting piece, which is connected to the pump or to the infusion instrument, is avoided.

A reservoir in which the reservoir can be heat-sterilized is advantageous. This should be a sterilization process that is carried out both before and after the reservoir is filled.

After the reservoir has been partially bonded together, it is optionally possible to clean the container of impurities.

As sterilization processes, the following are especially suitable: radiation sterilization or chemical sterilization.

As chemical sterilization processes, treatments with ethylene oxide, propan-3-olide, and diethyl dicarbonate, in addition to hydrogen peroxide and an ozone/steam mixture, are known.

Also, sterilization with high-energy radiation is possible. Here, gamma rays and x-rays are known.

Clean-room production is an alternative. As a result, this first sterilization step can be omitted.

The reservoirs are optionally packaged in a sterile manner in bacteria-proof, but gas-permeable film or aluminum. Sterilization is done by heat and/or chemical sterilization, with gamma rays or x-rays, neutron beams, or beta beams or a mixture of the above-mentioned beams. Preferred is treatment with hydrogen peroxide or an ozone/steam mixture.

Then, the reservoir is filled. Then, the filling opening is closed using the closure.

In the next step, the reservoir is heat-sterilized in an autoclave or sterilizer with hot air or using microwaves.

It is optionally possible to build up supporting pressure in the sterilizing room of the autoclave or the sterilization chamber by a gas in the sterilizing room, whereby the pressure on the outside surface of the reservoir is greater than, equal to, or less than the pressure on the inside surface of the reservoir. The supporting pressure can be defined as the pressure that corresponds to the sum of the partial pressures in the sterilizing room minus the partial pressure of the steam.

The packaging of the sterilized reservoirs in a container and the sterilization of the filled container are especially essential. This process can be carried out in a sterile room. This step is especially advantageous since it provides a precaution to offer the attending physician a reservoir that is also sterile externally. This reduces the danger of contamination. The reservoirs that are to be emptied mechanically are frequently used in sterile operating rooms. Only sterile or disinfected materials should be introduced into these rooms. Thus, a reservoir that is to be emptied mechanically must be absolutely sterile externally.

Very preferred are reservoirs in which the free-flowing substance is a medication or diagnostic agent, most preferably a reservoir in which the diagnostic agent is an imaging diagnostic agent. These are the following contrast media with the generic names: amidotrizoic acid, gadopentetic acid, gadobutrol, gadolinium EOB-DTPA, iopamidol, iopromide, iotrolan and iotroxic acid.

EXAMPLE

The invention is presented in the drawing by way of example.

In this case, FIG. 1 depicts a reservoir that is shown in upright, standing form.

Figure 1:
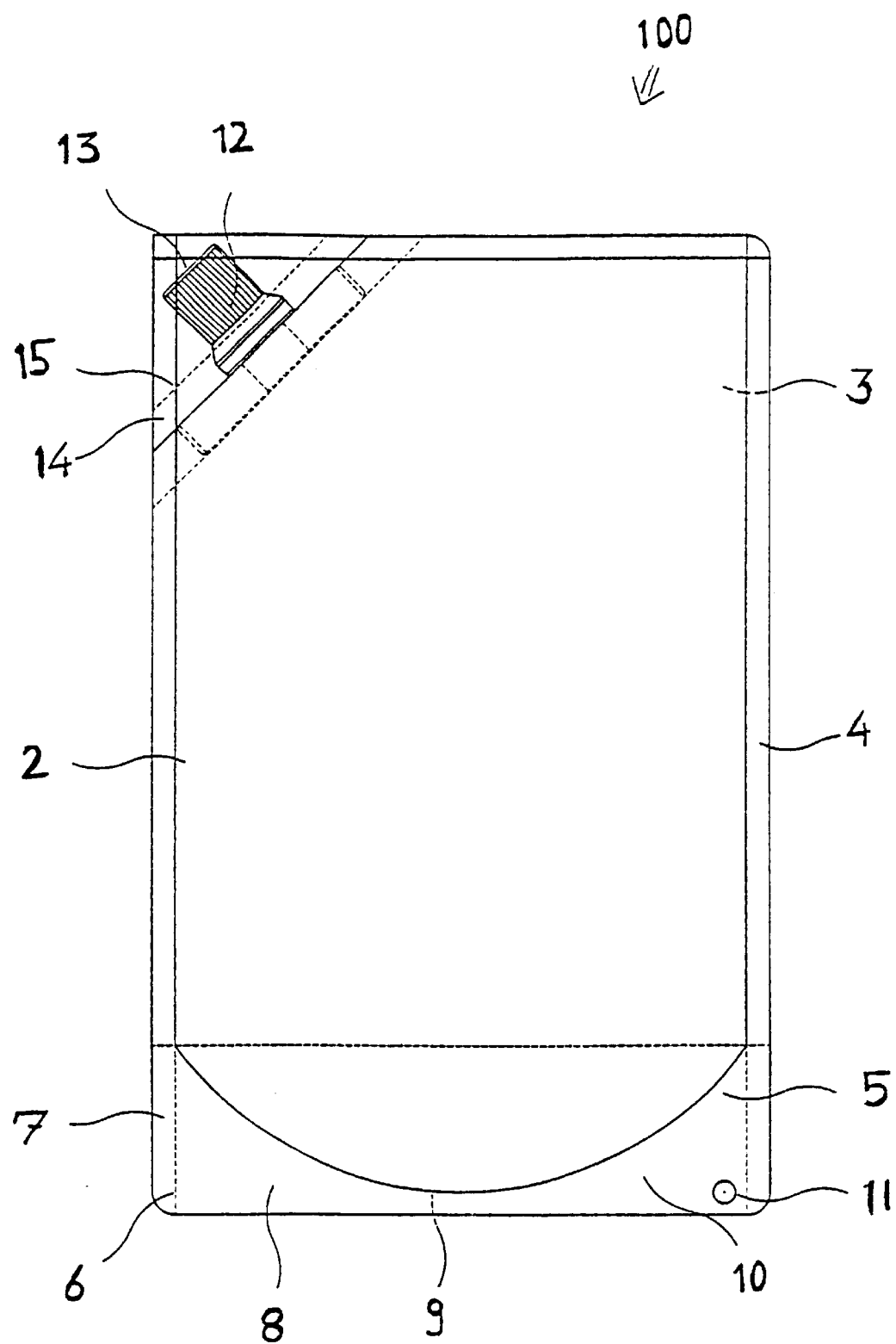

A reservoir 100 can be seen in FIG. 1. In this case, the observer looks at front wall 2, which is transparent. Here, front wall 2 could have only a transparent longitudinal strip, whereby the remaining area could be coated with aluminum. By two variants, this makes it possible to see rear wall 3, which is connected over the entire width and over length A to aluminum foil. The aluminum foil is located outside on the plastic film of rear wall 3. Front wall 2 and rear wall 3 are connected to one another via a welding seam 4 to form a pouch which contains the free flowing agent. This welding seam 4 has varying thicknesses. In the area of long side A, the welding seam is relatively large compared to the welding seam in the bottom area 5. Here, the rear and front walls directly adjoin one another, and no aluminum is present here. In a variant that is not depicted in the Figure, the bottom can also be made of aluminum, thereby maximizing the surface that is coated with aluminum and at the same time making it possible to perform optical checks through the front wall.

Figure 3:
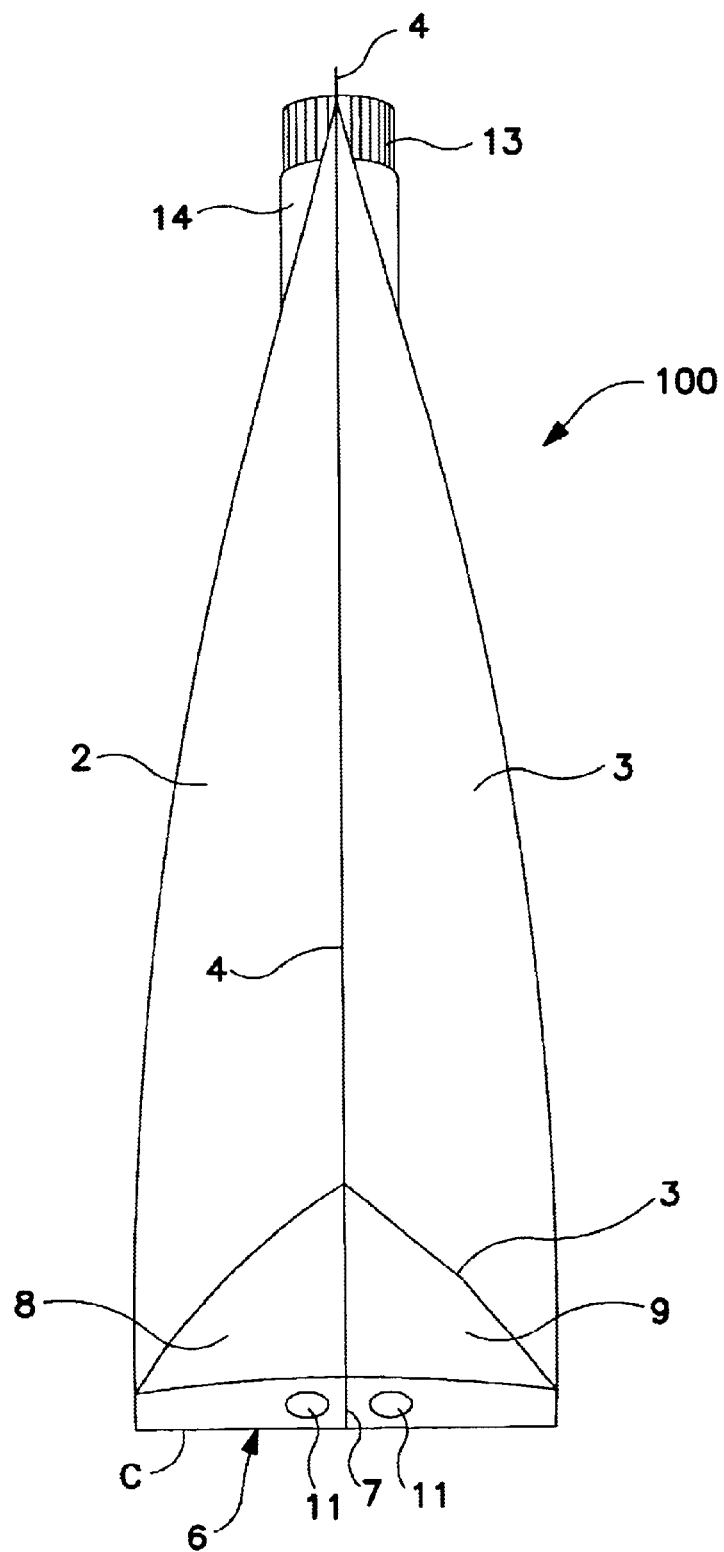
FIG. 3 is a back perspective view of the reservoir of FIGS. 1 and 2, showing the reservoir full or partially full and free standing.
Figure 4:
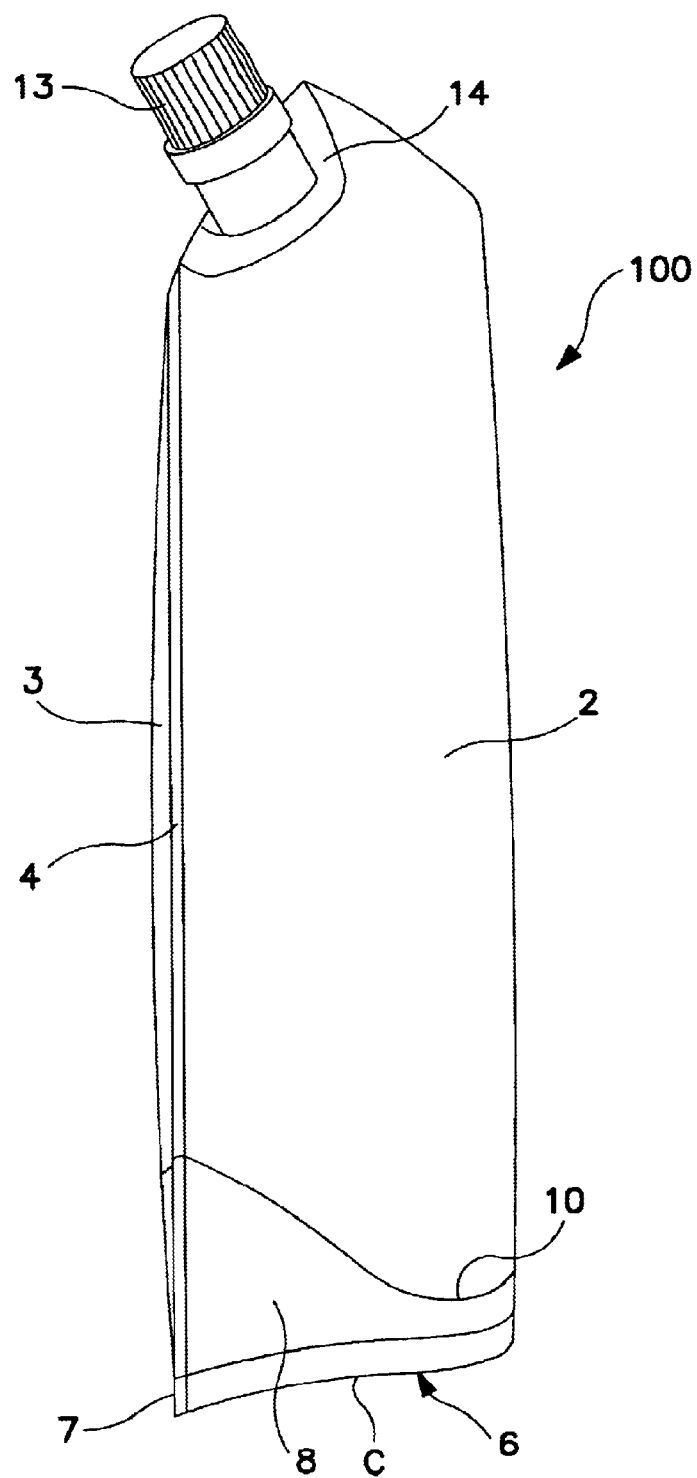
FIG. 4 is a front perspective of the reservoir of FIGS. 1 and 3 showing the reservoir full or partially full and free standing.

As seen in FIGS. 3 and 4, standing element 6 is in area C over the entire width of reservoir 100. In this case, standing element 6 comprises a front standing element 8 and a rear standing element 9, both of which are connected to one another via welding seam 7. Front standing element 8 and rear standing element 9 are connected in the area of line 10 to front wall 2 and rear wall 3. In this case, front standing element 8 and front wall 2 come directly into contact, as do rear standing element 9 and rear wall 3. front standing element 8 and rear standing element 9 have a crescent-shaped recess 10. In this area, the portion of the idealized rectangular standing element is replaced by either front wall 2 or rear wall 3.

The reservoir has a suspension hole 11 at the first end of the pouch, which faces the opening 12 at the second end of the pouch. Opening 12 comprises both a valve 16 and a closure 13, which must be removed before the container is emptied. Closure 13 is a screw closure. Opening 12 and closure 13 are encompassed by a protective film 14, which has a front side and a rear side. In addition, the protective film has a predetermined point of break 15, which makes it possible to remove protective film 14 with ease. Here, great care must be taken to ensure that the opening does not become contaminated. It is possible to remove the closure with non-sterile fingers, but the internal area of closure 13 and opening 12 must not become contaminated in so doing.

Figure 2:
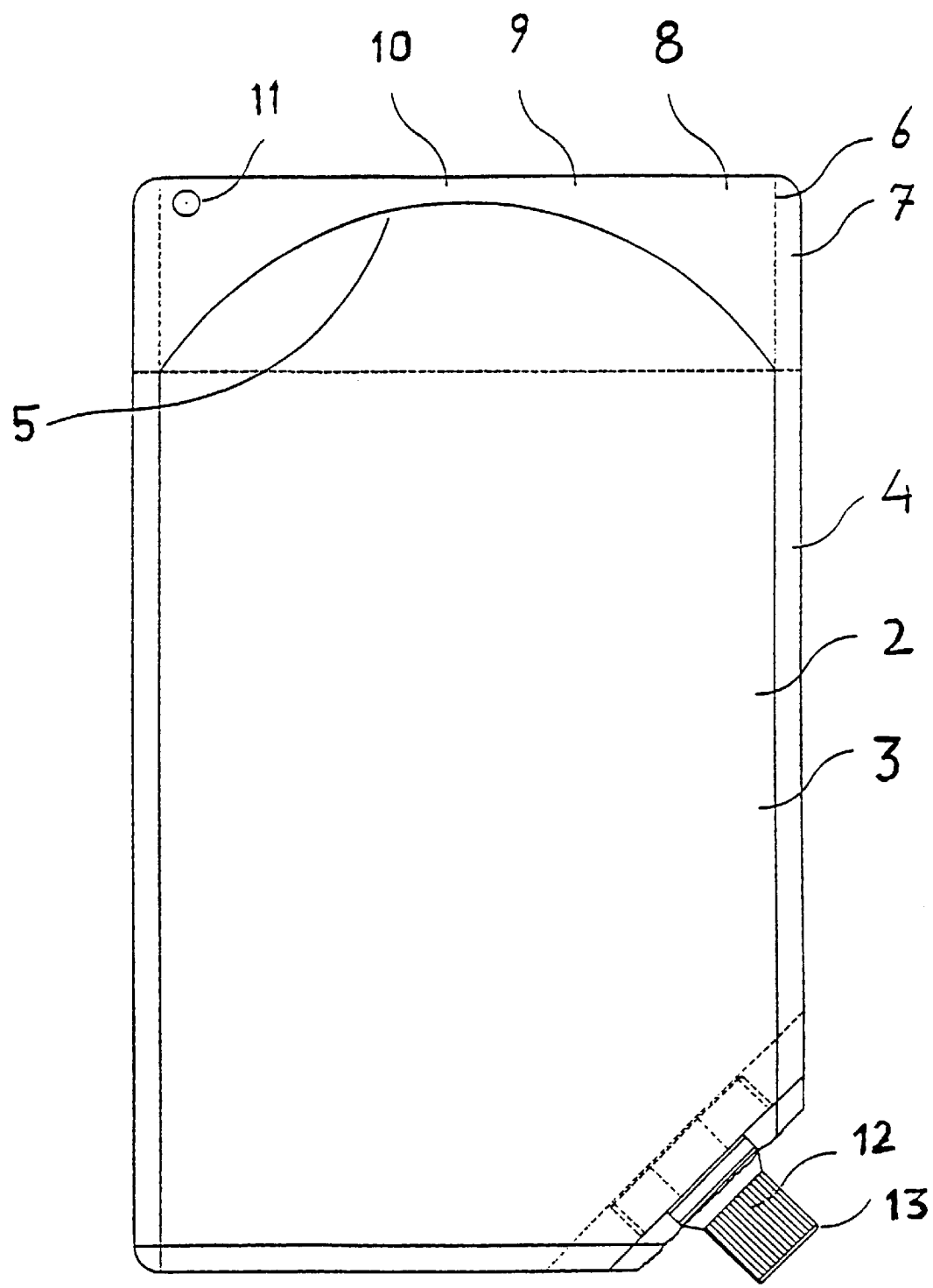
FIG. 2 shows a reservoir in suspended form, whereby the reservoir is suitable for emptying the free-flowing substance.

FIG. 2 shows a reservoir 100 in suspended form, whereby reservoir 100 is suspended on suspension element 11, such that opening 12, which is diagonally disposed with respect to the suspension element, forms the lowest point. For reasons of the drawing, the lowest point of the reservoir can be arranged not down on the side but rather in the right, lower corner.

It can also be seen that protective film 14 has already been removed. Closure 13 is still in opening 12, however.

List of Reference Symbols:

100 Reservoir
2 Front wall
3 Rear wall
4 Welding seam of the reservoir walls
5 Bottom of the reservoir
6 Standing element
7 Welding seam of the standing element
8 Front standing element
9 Rear standing element
10 Line
11 Suspension
12 Opening
13 Closure
14 Protective film
15 Predetermined point of break
16 Valve

What is claimed is:

1. A reservoir (100) for dispensing free-flowing substances comprising:
   (a) flexible reservoir walls (2 and 3);
   (b) the reservoir walls (2 and 3) being one-piece or being connected to one another;
   (c) the reservoir walls (2 and 3) forming at least portions of a sealed container, said container having at least one opening (12);
   (d) the reservoir walls (2 and 3) being connected at least partially to at least two rigid flat standing elements (8 and 9) which support the reservoir when resting on a supporting surface, the standing elements being separated at a standing area of the reservoir walls (2 and 3); and which standing elements (8 and 9) optionally are portions of the sealed container, when the standing elements (8 and 9) are held in spaced relation to one another when the reservoir (100) is full or partially full, to thereby provide a base for supporting the reservoir (100) on the supporting surface with the reservoir (100) extending upwardly therefrom;
   (e) the opening (12) having a closure (13) and a connection, wherein
     (i) portions of the reservoir walls and/or standing elements are made of a composite material, which comprises at least one plastic laminate, and
     (ii) the other portions of the reservoir walls and/or standing elements are made of a composite material, which comprises at least one plastic laminate and an aluminum laminate, the laminates being tightly connected to one another.

2. Reservoir according to claim 1, wherein the reservoir walls comprise a front wall (2) and a rear wall (3).

3. Reservoir according to claim 2, wherein the rear wall (3) is provided with an aluminum laminate; and the front wall (2) is transparent.

4. Reservoir according to claim 3, wherein lettering is printed on the aluminum laminate.

5. Reservoir according to claim 3, wherein the front wall (2) is comprised of polyester-polypropylene, and the rear wall (3) is comprised of a polyester-aluminum-polypropylene laminate.

6. Reservoir according to claim 3, wherein the aluminum laminate is provided with a plastic laminate on a side that faces away from the interior of the container.

7. Reservoir according to claim 6, whereby the aluminum laminate is made of a polypropylene inner layer, an aluminum middle layer, and a transparent plastic outer layer.

8. Reservoir according to claim 7, wherein the outer layer is made of polyester or polyamide.

9. Reservoir according to claim 1, wherein the reservoir walls (2 and 3) are more flexible than the standing elements (6).

10. Reservoir according to claim 1, the reservoir walls (2 and 3) are resistant to expansion.

11. Reservoir according to claim 1, the reservoir (100) has at least one suspension (11), which faces opening (12).

12. Reservoir according to claim 1, wherein the closure (13) is a screw closure with a tamper-proof closure or is a closure that can be opened with an adapter.

13. Reservoir according to claim 1, wherein the opening 12, including the closure (13), is encompassed by a protective film (14), which is part of reservoir walls (2 and 3) or is connected to the latter.

14. Reservoir according to claim 1, the reservoir (100) can be heat-sterilized.

15. Reservoir according to claim 1, wherein the free-flowing substance is a medication or a diagnostic agent.

16. Reservoir according to claim 15, wherein the diagnostic agent is an imaging diagnostic agent.

17. A reservoir for containing and dispensing free flowing medication or diagnostic agent therefrom, comprising:
   a pouch portion with first and second ends, the pouch portion having front and rear flexible walls attached along edges thereof for containing a free flowing agent, the front wall being transparent and the rear wall being an aluminum/plastic lamination;
   a rigid stand portion at the first end of the pouch portion, the rigid stand portion having a front standing element and a rear standing element connected to one another by the front and rear flexible walls, wherein the standing elements are held in spaced relation with respect to one another when the pouch is full or partially full, thereby providing a base for supporting the reservoir on a supporting surface with the pouch extending upwardly therefrom;
   an opening in the second end of the pouch for pouring out the free flowing agent, upon opening a closure associated therewith, and
   a suspension element at the first end of the pouch for hanging the reservoir up side down with the opening facing downwardly so that upon opening the closure, the free flowing agent drains through the opening.

18. The reservoir of claim 17 wherein a diagnostic agent is an imaging diagnostic agent.

19. The reservoir of claim 17 wherein the suspension element is a hole through the material forming the pouch portion in a portion not containing the medication or diagnostic agent.

20. The reservoir of claim 17 wherein a protective film encloses the opening and closure at the second end of the pouch, the protective film exposing the closure upon being cut or torn adjacent the closure.

21. The reservoir of claim 17 wherein the opening and closure at the second end of the pouch are diagonally disposed with respect to the suspension element at the first end of the pouch.

* * * * *

UNITED STATES PATENT AND TRADEMARK OFFICE
CERTIFICATE OF CORRECTION

PATENT NO. : 6,872,197 B1
APPLICATION NO. : 09/554438
DATED : March 29, 2005
INVENTOR(S) : Witowski It is certified that error appears in the above-identified patent and that said Letters Patent is hereby corrected as shown below:

Title page,
Item [54], Title, reads "TANK" should read -- RESERVOIR --.

Column 10,
Line 45, reads "agent, upon" should read -- agent upon --.
Line 48, reads "up side down" should read -- upside down --.

Signed and Sealed this

Eleventh Day of July, 2006

JON W. DUDAS
*Director of the United States Patent and Trademark Office*